(Model.)

J. M., T. & N. TOY.
Check Rowing Attachment to Corn Planters.

No. 239,576.    Patented March 29, 1881.

Attest.
Nelson Orange
Luther Thurlow

James M. Toy.
    by E. Thurlow, atty in fact.
Thomas Toy
    by E. Thurlow, atty in fact
Nelson Toy
    by E. Thurlow, atty in fact

N. PETERS, PHOTO-LITHOGRAPHER, WASHINGTON, D. C.

UNITED STATES PATENT OFFICE.

JAMES M. TOY, THOMAS TOY, AND NELSON TOY, OF WASHBURN, ILLINOIS.

CHECK-ROWING ATTACHMENT TO CORN-PLANTERS.

SPECIFICATION forming part of Letters Patent No. 239,576, dated March 29, 1881.

Application filed June 10, 1880. (Model.)

*To all whom it may concern:*

Be it known that we, JAMES M. TOY, THOMAS TOY, and NELSON TOY, all of Washburn, in the county of Woodford, in the State of Illinois, have invented an Improvement in Check-Rowing Attachments to Corn-Planters; and we do hereby declare that the following is a full, clear, and exact description thereof, reference being had to the annexed drawings, making a part of this specification, in which like letters of reference refer to like parts, and in which—

Figure 1:
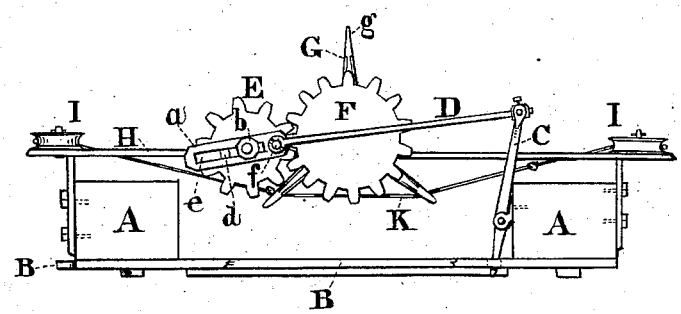
Figure 2:
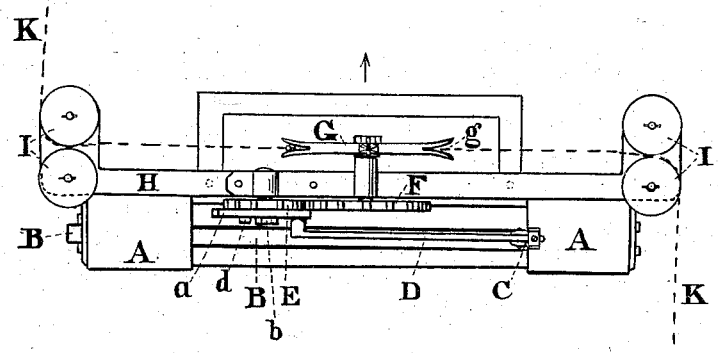
Figure 3:
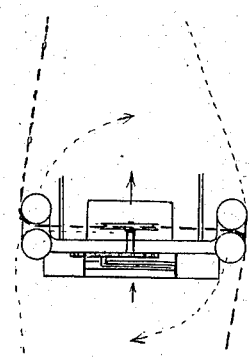

Figure 1 represents a rear elevation, showing the attachment, the seed-boxes, and the seed-dropping bar. Fig. 2 represents a plan view of Fig. 1. Fig. 3 is a plan illustrating the reversibility of the planter and apparatus without shifting the cord or wire used in operating the mechanism.

The invention relates to that form of check-rowing and seed-dropping apparatus in planting-machines which have a knotted cord or wire stretched across the field, said cord passing through the machine and connecting with radial forked arms to operate the mechanism. In combination with a gear-wheel, which is on a shaft holding the radial arms, we employ a gear-wheel whose shaft projects so as to pass through a slot in a plate forming a crank-arm, said plate being secured to the face of the wheel by an adjusting-nut on the threaded end of the projecting shaft. A stud projects from the face of the wheel into the slot in the crank-arm, and serves to further secure said arm in position. The slotted crank-arm is connected, by intermediate mechanism, with the oscillating seed-bar, and the crank is adjustable to or from the center of the wheel by the means above mentioned.

Referring to the drawings, A designates the seed-boxes of a planting-machine, and B the oscillating seed-bar.

C is a lever, pivoted, as shown, to the side of a seed-box, A, and connected at the lower end with the bar B.

E is a gear-wheel, mounted on a horizontal bar, H, which carries the whole attachment, the shaft or axle of said wheel projecting so as to pass through a slot, e, in the plate or adjustable crank-arm a. The adjusting-nut b on the threaded end of the axle serves to secure the arm a in place, and a pin or stud, d, fixed to wheel E, and extending into the slot, also serves to hold arm a in position.

D is a connecting-rod, having one end coupled with arm a by pin f, the other end being connected with the upper end of the pivoted lever C.

F is a gear-wheel, on a short horizontal shaft, carried by bar H, in like manner with wheel E, with which wheel F engages. On the forward end of the shaft of wheel F is a triangular wheel, G, of somewhat greater radius than F, and consisting of radial arms, each arm ending in a fork, g, for receiving the cord or wire K, which passes through the machine and actuates the mechanism. As will be seen, the attachment will be equally operative with the wheels E, F, and G, placed in horizontal positions, such change requiring a little different construction of the mechanism which connects the crank with the seed-bar B.

I designates the pulleys, two being carried by the bar H at each end thereof, said bar being constructed to hold the two pairs of pulleys opposite to each other, and on a proper line to have the knotted cord K bear against the forks g of the radial arms, as shown, the said cord passing between two pulleys on one side as it enters the machine, and between the opposite pulleys in leaving the machine. The advantage of a pair of pulleys on each side is this: It is not necessary in reversing the course of the planter for new rows to shift or change the cord K, the machine being simply turned with its front in the opposite direction, some delay being thus saved. This will be readily understood by reference to Fig. 3 in the drawings.

In operation, the cord or wire K entering between the pulleys on one side and crossing the machine, the knots impinge successively against each of the forks g, the first knot causing a fork to make one-third of a circuit. The resulting movement of the crank a is one-half of a revolution, causing a movement of the seed-dropping bar across the machine. In like manner, the next knot coming in the same direction carries the next fork g one-third of a revolution, thereby causing a movement of the seed-bar in the opposite direction. During operation the wheel E acts as a check-wheel, preventing the undue motion of the wheel F, as the knots of the passing cord strike successively the forks $g$.

The whole attachment, constructed as shown, can be readily affixed to any planting-machine of that form having a seed-dropping bar that may be operated by hand.

The wheel E, provided with an adjustable crank-arm, slotted and secured to said wheel, as shown, is a convenient means of actuating and regulating the movement of lever C, irrespective of the distance between the knots of the cord.

The placing of a pair of pulleys for the cord on each side of the machine renders it unnecessary to shift the cord when the course of the machine is reversed.

We are aware that in check-rowing mechanism a crank-plate secured to a wheel and connecting with the seed-dropping bar has been heretofore used, and therefore we do not claim such, broadly; but

We claim—

In check-rowing mechanism for planting-machines, the combination, with gear-wheel F, of the wheel E, having its shaft projecting through the slot in crank-arm $a$, the adjusting-nut $b$, and the stud $d$, the parts being constructed and arranged as shown, for the purpose set forth.

In testimony that we claim the foregoing attachment to corn-planters we have hereunto set our hands this 4th day of June, A. D. 1880.

JAMES M. TOY.
THOMAS TOY.
NELSON TOY.

Witnesses:
CHAS. SCHLEIGH,
S. W. MCCULLOCH.